United States Patent [19]

Kusuda et al.

[11] Patent Number: 4,857,192
[45] Date of Patent: Aug. 15, 1989

[54] IN PHASE CORRUGATED PLATE MEMBRANE MODULE SUPPORT

[75] Inventors: Masataka Kusuda; Shuji Fukuma; Masaki Nishiyama, all of Osaka, Japan

[73] Assignee: Nitto Electric Industrial Co., Ltd., Osaka, Japan

[21] Appl. No.: 89,801

[22] Filed: Aug. 27, 1987

[30] Foreign Application Priority Data

Aug. 27, 1986 [JP] Japan ................................ 61-201144
Sep. 11, 1986 [JP] Japan ................................ 61-215677
Dec. 12, 1986 [JP] Japan ................................ 61-297283

[51] Int. Cl.$^4$ .............................................. B01D 13/00
[52] U.S. Cl. ........................... 210/321.84; 210/433.1; 210/489; 210/494.1; 55/158; 55/521
[58] Field of Search .................. 55/497, 500, 501, 521, 55/158; 210/486, 488, 489, 494.1, 433.1, 433.2, 321.6, 321.64, 321.84

[56] References Cited

U.S. PATENT DOCUMENTS

| | | | |
|---|---|---|---|
| 2,647,637 | 8/1953 | Leet | 210/494.1 |
| 2,758,083 | 8/1956 | Van Hoek et al. | 210/321.64 |
| 3,037,637 | 6/1962 | Bub | 210/494.1 |
| 3,722,696 | 3/1973 | Dwyer et al. | 210/497.2 |
| 3,726,407 | 4/1973 | Weyand | 210/497.2 |
| 4,234,428 | 11/1980 | Schnell | 210/321.64 |

FOREIGN PATENT DOCUMENTS

| | | | |
|---|---|---|---|
| 569626 | 1/1959 | Canada | 210/494.1 |
| 0066752 | 12/1982 | European Pat. Off. | 210/494.1 |
| 2951853 | 10/1980 | Fed. Rep. of Germany | |
| 1065017 | 10/1952 | France | 210/494.1 |
| 1189159 | 9/1957 | France | 210/494.1 |
| 19704 | 6/1899 | Sweden | 210/494.1 |

Primary Examiner—Richard V. Fisher
Assistant Examiner—Wanda L. Millard
Attorney, Agent, or Firm—Sughrue, Mion, Zinn, Macpeak & Seas

[57] ABSTRACT

In a plate type membrane module in which a number of units, each comprising a membrane supporting plate with corrugated surfaces, and membranes formed on the corrugated surfaces, with permeate passageways between the membrane and the corrugated surfaces, are laminated in such a manner that passageways for a solution to be filtered are formed between the units. The waveforms of the confronted corrugated surfaces of adjacent membrane supporting plates are in same phase with each other. Thereby the pulsation of the solution and accordingly the vibration of the membranes can be effectively prevented, with the result that the membranes are prevented from early fatigue.

4 Claims, 6 Drawing Sheets

FIG. 4
FIG. 5
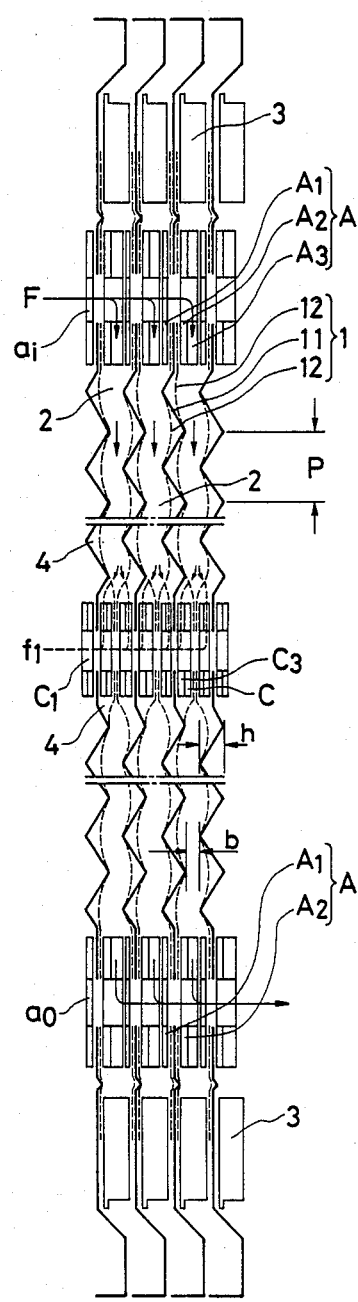
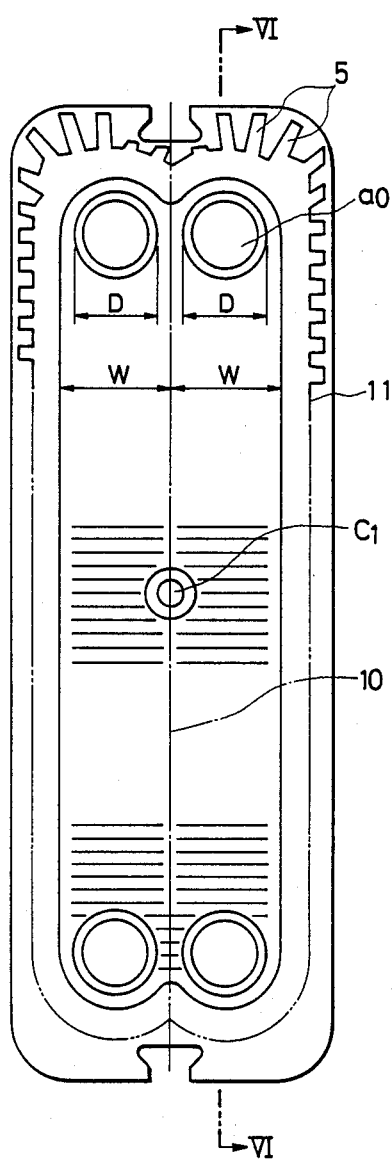

IN PHASE CORRUGATED PLATE MEMBRANE MODULE SUPPORT

BACKGROUND OF THE INVENTION

1. Field of the Invention

This invention relates to an improvement of a plate type membrane module.

2. Background of the Invention

A plate type membrane module is well known in the art which filters a solution by ultrafiltration or reverse osmotic filtration. The unfiltered solution will hereinafter be referred to as "raw solution" and the filtered solution as "permeation".

The fundamental structure of a plate type membrane module is as shown in FIG. 1. In the module, a number of units $1'$ are laminated with spaces therebetween which serve as raw solution passageways. Each of the units $1'$, as shown in FIG. 2, is made up of a membrane supporting plate $11'$ having permeation passage grooves $13'$ on both its sides. Membranes $12'$ are formed on both sides of the plate $11'$. As shown in FIG. 1, the axial ends of the units $1'$ have raw solution passage holes $a_i'$ and $a_o'$.

Roughly stated, the device filters the raw solution as follows. While the raw solution is flowing as indicated by the arrow $F'$, the solvent of the solution is separated from the raw solution or impurities as it passes through the membranes $12'$ of the units $1'$. The liquid thus permeated is led out of the filter device through the permeation passage grooves $13'$ (means for leading the liquid out of the filter device is not shown in detail).

In this type of module, shown in FIG. 3, the units $1'$ employ corrugated plates $11''$ of plastics as film or membrane supporting plates on which membranes $12''$ are laid. In raw solution passageways $2''$ between the units, the membranes $12''$ are bent inwardly with the tops of the waveform of the corrugated plates $11''$ as fulcrums. The waveforms of the corrugated plates $11''$ on both sides of each raw solution passageway $2''$ are completely opposite in phase to each other. That is, each of the raw solution passageways $2''$ is made alternately narrow and broad. The speed of flow of the solution is increased at the narrow parts of the passageway and decreased at the broad parts so that the flow of the solution pulsates and the membranes are vibrated by the solution thus pulsated. Since the membranes are supported by a number of fulcrums, they may be readily fatigued or damaged at the fulcrums.

SUMMARY OF THE INVENTION

Accordingly, an object of this invention is to eliminate the above-described difficulty accompanying a conventional filter device (i.e., membrane module).

More specifically, an object of the invention is to provide a plate type membrane module which is free from the above-described early fatigue and damage although it employs corrugated supporting plates with a membrane supported at a number of points.

The foregoing object and other objects of the invention have been achieved by the provision of a plate type membrane module including a number of units. Each unit comprises a membrane supporting plate having both sides corrugated and membranes formed on the corrugated sides. Permeated liquid passageways are formed between the membranes and the corrugated sides. The units are laminated in such a manner that raw solution passageways of substantially constant width are formed between the units. According to the invention, the waveforms of the corrugated sides of adjacent membrane supporting plates which are confronted with each other are in the same phase with each other.

The nature, principle and utility of the invention will become more apparent from the following detailed description when read in connection with the accompanying drawings.

BRIEF DESCRIPTION OF THE DRAWINGS

In the accompanying drawings:

FIG. 4 is an explanatory diagram showing one example of a plate type membrane module according to this invention;

FIG. 5 is an explanatory diagram showing one example of a membrane supporting plate in the membrane module according to the invention;

DETAILED DESCRIPTION OF THE INVENTION

Figure 1:
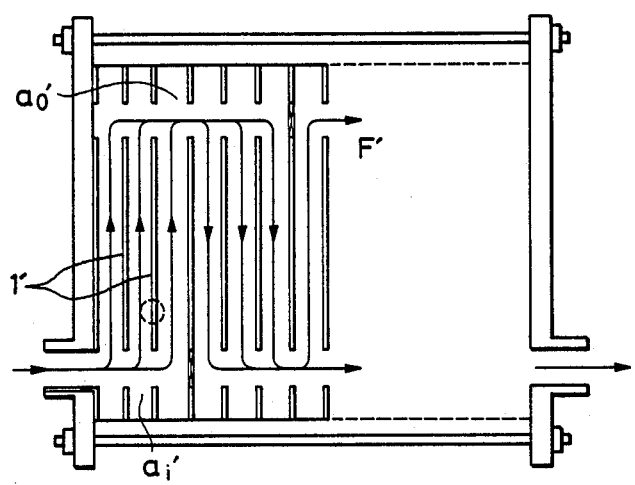
FIG. 1 is an explanatory diagram showing the structure of a conventional plate type membrane module.
Figure 2:
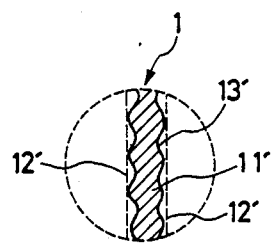
FIG. 2 is an enlarged explanatory diagram showing an encircled part of FIG. 1.
Figure 3:
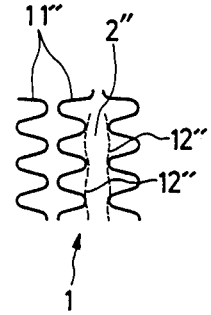
FIG. 3 is an explanatory diagram showing a conventional membrane supporting plate.

One example of a plate type membrane module according to this invention, as shown in FIG. 4, comprises parallel units 1 each having a substantilly triangular-wave shaped film of membrane supporting plate 11 made of stainless steel or plastic and two films or membranes 12 formed on its both sides. The films or membranes 12 are formed of porous polysulfone with a coating of unwoven cloth. A number of units 1 are laminated in such a manner that gaps, namely, raw solution passageways 2 of substantially constant width are formed therebetween. An end ring spacer A supports the unit 1 in such a manner as to seal the membrane supporting plate 11 and the membrane 12. The end ring spacer A is generally circular about a horizontal axis in FIG. 4 and is fitted in corresponding circular apertures in the membrane supporting plate 11 and the membrane 12. The end ring spacer A comprises a first ring member $A_1$ on one side of the unit 1 and a second ring member $A_2$ on the other side. The second ring member $A_2$ has a radial through-groove $A_3$ for providing a flow path from a horizontal raw solution flow-in hole $a_i$. Another end ring spacer A is attached to each unit 1 to provide a horizontal raw solution flow-out hole $a_o$. Further in FIG. 4, middle ring spacers C (with radial through-grooves $C_3$) provide a horizontal permeate lead-out hole $C_1$. The middle ring spacers C are attached, back to back, to both sides of each of the membrane supporting plates 11 in such a manner as to seal the membranes. Ring spacers of a different configuration for an axially stacked filter are disclosed in U.S. Pat. No. 3,623,610 to Olsen et al. Packings 3 seal the units 1 at the outer ends of the units.

As shown in FIG. 4, the substantially triangular waveforms of the membrane supporting plates are in the same phase with one another.

A raw solution F is processed in the membrane module as follows. The raw solution F is allowed to flow, under pressure, along the path of the raw solution flow-in hole $a_i$, the raw solution passageways 2 between the units 1, and the raw solution flow-out hole $a_o$. While the raw solution F is flowing in this manner, the solvent of the solution F is passed through the membranes 12 of the units 1 and thus separated from the raw solution. The permeate $f_1$ thus passed through the membrane 12 flows in permeate passageways 4 each formed between the membrane supporting plate 11 and the membrane 12. The permeate $f_1$ is then led out of the device through the permeate lead-out hole $C_1$.

As shown in FIG. 4, the membranes 12, being stretched by the pressure of the raw solution, are bent inwardly between the tops of the substantially triangular waveform of the membrane supporting plates 11. However, since the triangular waveforms of the membrane supporting plates 11 are in the same phase with one another, the raw solution passageways 2 between the membrane supporting plates 11 are constant in width though in a zigzag form so that the speed of flow of the raw solution is constant in the passageways 2. This eliminates the difficulty accompanying the conventional membrane module that, because of the cyclical variation of the speed of flow, the raw solution pulsates and accordingly the membranes vibrate. That is, early fatigue of the membranes can be prevented.

It is preferable that the pitch p of the waveform of the membrane supporting plates, the amplitude h of the waveform, and the minimum width b of the passageway between the membrane supporting plates meet the following conditions:

$4 < p/h < 18$, and
$0 < h/b < 3.0$.

Preferably the last condition is restricted to:
$0.5 < h/b < 2.0$.

If p/h is made excessively small, then the number of undulations and associated peaks per unit length of the membrane supporting plate 11 is correspondingly increased. That is, the number of positions where the membrane 12 is brought into contact with the peaks is increased. Since the membrane 12 is brought into close contact with the peaks by the pressure of the raw solution, the permeation effect is lowered. That is, the membrane module cannot maintain a sufficiently high permeation efficiency. If, on the other hand, the value p/h is made excessively large, then the membrane supporting distance is large when compared with the height of the undulations and the bending of the membrane by the pressure of the raw solution is increased as much. That is, the contact area between the membrane and the base of the undulations is increased. Thus, in this case also, it is difficult to maintain the permeation efficiency sufficiently high. Therefore, the value p/h is selected in a range of from 4 to 18.

If h/b is made excessively large, then the passageways 2 greatly zigzag. In this case, at the deep corners of the zigzag line, the flow of the raw solution is impeded so that the permeation volume is lowered. Thus, in this case also, it is impossible to operate the filter device with sufficiently high permeation efficiency.

On the other hand, if h/b is made excessively small, then the passageways are in the form of straight lines, so that it would be impossible to prevent non-uniformity in concentration of solution by the turbulence generated by the zigzag passageways. This lack of turbulence would not sufficiently enhance permeability. Therefore, it is preferable to select the ratio h/b at a value not greater than 3.0, more preferably, in a range of 0.5 to 2.0.

The plate-type membrane module according to the present invention may be applied to either an ultra filtration mode (normal operating pressure of 2 to 7 kg/cm$^2$) or a reverse osmotic filtration mode (normal operation pressure of 7 to 20 kg/cm$^2$).

For the ultra filtration mode, it is preferable to set p/h in a range of 4 to 8 and to set h/b in a range of 0.7 to 1.8. For the osmotic filtration mode, it is preferable to set p/h in a range of 8 to 16 and to set h/b in a range of 0.7 to 1.0.

Figure 6:
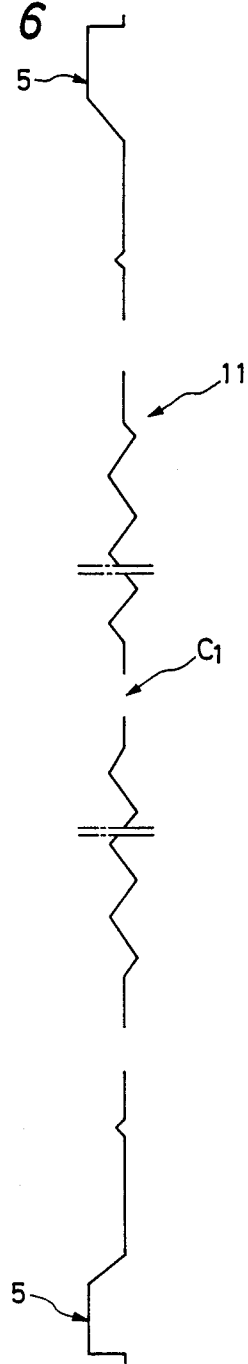
FIG. 6 is a sectional view taken along line VI—VI in FIG. 5.

FIG. 5 shows one example of the membrane supporting plate 11 used in the membrane module according to the invention. The plate 11 can be formed of a stainless steel plate by pressing or may be a polypropyrene plate formed by injection molding. The membrane supporting plate 11 has a permeation collecting path $C_1$ along its central axis 10 (which is not wavy). FIG. 6 is a sectional view taken along line VI—VI in FIG. 5.

The membrane supporting plate 11 are laminated as follows. Two membrane supporting plates are laminated together after being turned 180° relative to each other around the central permeation lead-out hole $C_1$. Spacer protrusions 5 are formed at the peripheries of the membrane supporting plates 11 in such a manner that in each membrane supporting plate 11, the right spacer protrusions 5 are shifted in phase from the left space protrusions 5. In this operation of turning the plates 11 by 180°, the spacer protrusions 5 are placed in positions relative to each other to maintain a predetermined gap between the two plates 11 and to place the substantially triangular waveforms of the two plate in same phase with each other.

A membrane module with the above-described membrane supporting plates 11 was fabricated under the conditions that p=10 mm, h=2.1 mm, b=1.3 mm. The raw solution passageway was 45 mm in diameter, the effective width of the supporting plate was 180 mm, and the effective height of the plate was 600 mm. The permeation efficiency of the membrane module thus fabricated was about twice as large as the permeation efficiency of a membrane module which was formed under the same conditions except for p=2.1.

It is desirable that, as shown in FIG. 5, the ratio of the flow path width W to the diameter D of the raw solution flow-in hole $a_i$ is 1.5 or less.

Figure 7:
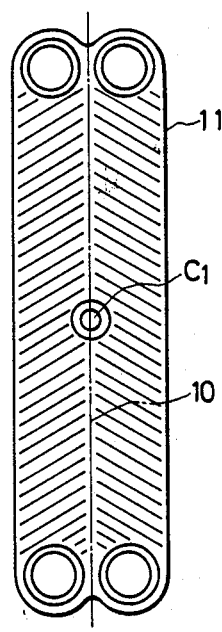
FIGS. 7 and 8 are explanatory diagrams showing other examples of the membrane supporting plate according to the invention.
Figure 8:
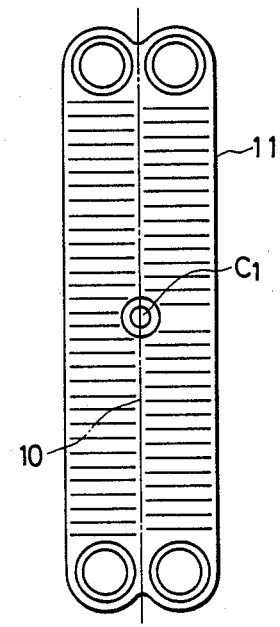

The membrane module of the invention may use membrane supporting plates in which, as shown in FIG. 7, the waves are symmetrically but obliquely extended on both sides of the central linear liquid collecting path 10. Furthermore, the membrane module may use membrane supporting plates of a kind which are laminated back to back. If, in this case, the plates are laminated by turning 180°, it is necessary that, as shown in FIG. 8, the undulations on the right side of the central liquid collecting path are shifted by a half pitch from those on the left side.

Figure 9:
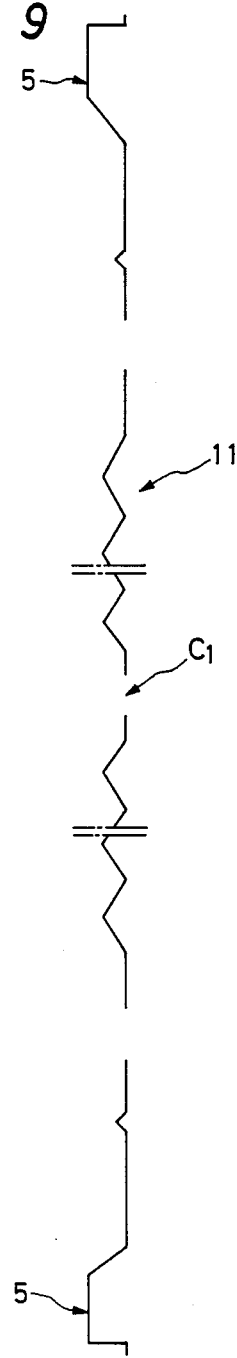
FIG. 9 is an explanatory diagram showing another example of the membrane supporting plate in the membrane module according to the invention.

In the membrane supporting plate 11 shown in FIG. 6, the center line, or average height, of the undulation is flush with the flat surface of the plate 11. However, the plate may be so modified that, as shown in FIG. 9, the bases of the undulation are flush with the flat surface.

As was described above, in the plate type membrane module of the invention, the membrane supporting plate of each of the units is corrugated. However, the raw solution passageways (zigzag in section) between the units are constant in width. This can prevent the raw solution from pulsating and accordingly prevent the vibration of the membrane which otherwise may be caused. Therefore, even if, in each of the membrane supporting plate, the membranes are supported by a number of crests, the early fatigue of the membranes can be effectively prevented according to the invention.

Furthermore, as the raw solution passageways are zigzag, the concentration polarization can be satisfactorily prevented by a turbulance effect.

What is claimed is:

1. A plate type membrane module comprising a plurality of units, each unit comprising:
    a membrane supporting plate having both sides corrugated; and
    membranes formed on said corrugated sides, with permeate passageways formed between said membranes and said corrugated sides;
    wherein said units are laminated in such a manner that raw solution passageways of substantially constant width are formed between said units for fluid flow in directions substantially parallel to said corrugated sides, such that the shape of said raw solution passageways are determined solely by the shape of said corrugated sides and said membranes; and
    wherein waveforms of said corrugated sides of immediate adjacent ones of said membrane supporting plates which are confronted with each other are in phase with each other.

2. A membrane module as claimed in claim 1, in which:
    p/h is in a range of from 4 to 18, where p is a pitch of the waveforms of said membrane supporting plates and h is an amplitude of the waveforms; and
    h/b is 3.0 or less but greater than 0, where b is a minimum width of passageways between said membrane supporting plates.

3. A membrane module as claimed in claim 2, in which h/b is in a range of 0.5 to 2.0.

4. A membrane module as claimed in claim 1, wherein each of said membrane supporting plates includes a first through hole communicating with said raw solution passageways for inputting a raw solution, a second through hole communicating with said raw solution passageways for outputting said raw solution and a third through hole for outputting a permeate.

* * * * *